US011716326B2

(12) United States Patent
Tsarfati et al.

(10) Patent No.: US 11,716,326 B2
(45) Date of Patent: *Aug. 1, 2023

(54) PROTECTIONS AGAINST SECURITY VULNERABILITIES ASSOCIATED WITH TEMPORARY ACCESS TOKENS

(71) Applicant: CyberArk Software Ltd., Petach-Tikva (IL)

(72) Inventors: Omer Tsarfati, Petach-Tikva (IL); Asaf Hecht, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,114

(22) Filed: Feb. 16, 2022

(65) Prior Publication Data

US 2022/0174062 A1  Jun. 2, 2022

Related U.S. Application Data

(63) Continuation of application No. 16/869,906, filed on May 8, 2020, now Pat. No. 11,258,788.

(51) Int. Cl.
*H04L 29/06* (2006.01)
*H04L 9/40* (2022.01)
*G06N 20/00* (2019.01)

(52) U.S. Cl.
CPC ......... *H04L 63/0853* (2013.01); *G06N 20/00* (2019.01); *H04L 63/102* (2013.01); *H04L 63/108* (2013.01); *H04L 63/1416* (2013.01)

(58) Field of Classification Search
CPC ...... H04W 12/06; H04W 12/08; H04L 67/02; H04L 63/08; H04L 63/102; H04L 9/3213;
(Continued)

(56) References Cited

U.S. PATENT DOCUMENTS 8,056,123 B2 * 11/2011 Correl ................... G06F 21/31
713/184
8,990,172 B1 * 3/2015 Zhao ................. G06Q 30/0255
707/692

(Continued)

*Primary Examiner* — Khalid M Almaghayreh
(74) *Attorney, Agent, or Firm* — Finnegan, Henderson, Farabow, Garrett & Dunner, LLP

(57) ABSTRACT

Disclosed embodiments relate to systems and methods for securing the use of temporary access tokens in network environments. Techniques include identifying a request for an action involving a target network resource requiring a temporary access token; receiving, from the target network resource, a temporary access token; storing the temporary access token separate from the network identity; generating a customized replacement token having an attribute different from the temporary access token such that the customized replacement token cannot be used directly with the target network resource; providing the customized replacement token to the network identity; monitoring use of the customized replacement token to detect an activity identified as being at least one of potentially anomalous or potentially malicious; receiving an access request to access the target network resource; and based on the detected activity, denying the access request from the network identity.

20 Claims, 7 Drawing Sheets

(58) Field of Classification Search
CPC . H04L 63/10; H04L 63/0876; H04L 63/0884; H04L 67/20; H04L 63/20; H04L 63/083; G06N 20/00; G06N 3/08; G06F 21/566
See application file for complete search history.

(56) References Cited

U.S. PATENT DOCUMENTS

| | | | | |
|---|---|---|---|---|
| 9,088,556 | B2* | 7/2015 | Truskovsky | H04L 63/08 |
| 9,531,719 | B1* | 12/2016 | Sutton | H04L 63/083 |
| 9,930,040 | B2* | 3/2018 | Yu Quach | H04L 9/3228 |
| 10,038,563 | B2* | 7/2018 | Gaddam | H04L 63/0823 |
| 10,333,924 | B2* | 6/2019 | Yang | H04L 63/1441 |
| 10,659,462 | B1* | 5/2020 | Kim | H04L 63/0876 |
| 10,666,657 | B1* | 5/2020 | Threlkeld | H04L 9/0643 |
| 10,673,862 | B1* | 6/2020 | Threlkeld | G06F 21/62 |
| 2006/0068788 | A1* | 3/2006 | Zivkovic | H04L 63/0846 455/436 |
| 2009/0125972 | A1* | 5/2009 | Hinton | G06F 21/41 726/1 |
| 2013/0019308 | A1* | 1/2013 | Meliksetian | H04L 67/02 726/22 |
| 2013/0047245 | A1* | 2/2013 | Radhakrishnan | G06F 21/335 726/9 |
| 2013/0145148 | A1* | 6/2013 | Shablygin | H04L 9/40 713/155 |
| 2015/0237074 | A1* | 8/2015 | Mardikar | H04L 63/08 726/1 |
| 2015/0326578 | A1* | 11/2015 | Hsu | H04L 63/108 726/9 |
| 2016/0283740 | A1* | 9/2016 | Roundtree | H04L 63/104 |
| 2016/0381023 | A1* | 12/2016 | Dulce | H04L 63/1408 726/9 |
| 2017/0243417 | A1* | 8/2017 | Manikantan Shila | H04W 12/06 |
| 2017/0244864 | A1* | 8/2017 | Ishino | H04N 1/4413 |
| 2017/0331832 | A1* | 11/2017 | Lander | H04L 63/102 |
| 2017/0337549 | A1* | 11/2017 | Wong | G06F 21/6263 |
| 2018/0048665 | A1* | 2/2018 | Shulman | H04L 63/1425 |
| 2018/0316676 | A1* | 11/2018 | Gilpin | H04L 63/20 |
| 2018/0351741 | A1* | 12/2018 | Kim | H04L 9/3213 |
| 2019/0079526 | A1 | 3/2019 | Vallespi-Gonzalez et al. | |
| 2019/0086549 | A1 | 3/2019 | Ushani et al. | |
| 2019/0215320 | A1* | 7/2019 | Alzate | G06F 16/955 |
| 2019/0273746 | A1* | 9/2019 | Coffing | G06Q 20/40 |
| 2020/0052899 | A1* | 2/2020 | Finlow-Bates | H04L 9/0863 |

* cited by examiner

PROTECTIONS AGAINST SECURITY VULNERABILITIES ASSOCIATED WITH TEMPORARY ACCESS TOKENS

CROSS-REFERENCE TO RELATED APPLICATIONS

This application is a continuation of U.S. patent application Ser. No. 16/869,906, filed on May 8, 2020. The aforementioned application is incorporated herein by reference in its entirety.

BACKGROUND

In modern network-based environments, it is increasingly important for organizations to securely manage access to restricted network resources while maintaining efficiency for users working with the restricted resources. To manage this effectively, organizations often use access tokens which may encapsulate the security identity of users for purposes of granting access to a resource. For example, once a user has provided credentials, such as a username and password, a temporary token may be provided to allow the user to subsequently access to a resource for a limited time or limited purpose.

While the use of temporary access tokens may ensure some level of security within a network, they are not without flaws. Some network environments may have hundreds of valid temporary tokens at any given time, which may make monitoring and tracking the use of the tokens difficult if not impossible. For example, it may be easy to track the use of a single specific access token within a network and detect potentially malicious activity. However, if an attacker gets ahold of a temporary access token, they may be able to use the token to create a second temporary token to access the resource. This may be repeated many times, effectively converting the temporary token into a permanent token for the attacker. The use of these different temporary tokens may be difficult to detect and, accordingly, a breach may not be detected until after damage to the network or organization has been performed.

To address these issues, existing techniques may include manually setting limitations on the authorization server, for example through policies in a role configuration. For example, the usage of a role may be restricted to a specific IP address, etc. Such techniques, however, are inefficient, requiring manual setting of these roles and policies. Further, they are not adaptive to particular requests or users and monitoring these tokens and/or roles in larger network environments may be impractical.

Accordingly, in view of these and other deficiencies in existing techniques, technological solutions are needed for automatically securing the use of temporary access tokens in network environments. Solutions should advantageously allow for monitoring or auditing the use of temporary tokens within a network environment. Some solutions may ensure that if a temporary access token is misappropriated, it cannot be used by an attacker to generate new tokens or otherwise access a restricted resource. Further, effective technological solutions should allow for management of security tokens and/or associated roles dynamically in response to individual user requests.

SUMMARY

The disclosed embodiments describe non-transitory computer readable media, systems, and methods for securing the use of temporary access tokens in network environments. For example, in an embodiment, a non-transitory computer readable medium may include instructions that, when executed by at least one processor, cause the at least one processor to perform operations for securing the use of temporary access tokens in network environments. The operations may comprise identifying a request from a network identity for an action involving a target network resource, which may require a temporary access token. The operations may further comprise performing, based on a security policy, at least one of storing the temporary access token separate from the network identity and providing the network identity with a customized replacement token having an attribute different from the temporary access token, or creating a customized replacement role for the network identity, the customized replacement role having associated permissions that are customized for the network identity based on the request.

According to a disclosed embodiment, the operations may further comprise monitoring use of the customized replacement token and detecting an anomaly in the monitored use.

According to a disclosed embodiment, the operations may further comprise monitoring use of the customized replacement token and detecting a potentially malicious activity involving the customized replacement token.

According to a disclosed embodiment, the action may include at least one of: accessing the target network resource or obtaining a role for the network identity to use with the network identity.

According to a disclosed embodiment, the operations may further comprise receiving an access request from the network identity to access the target network resource, the access request including the customized replacement token; and asserting the temporary access token to the target network resource on behalf of the network identity.

According to a disclosed embodiment, the temporary access token may be provided to the network identity on a just-in-time basis.

According to a disclosed embodiment, the operations may further comprise dynamically generating the temporary access token in response to the request.

According to a disclosed embodiment, operations may further comprise replacing the temporary access token with a new version of the temporary access token.

According to a disclosed embodiment, the associated permissions of the customized replacement role may include at least one of: a network address restriction on access to the target network resource, or a location-based restriction on access to the target network resource.

According to a disclosed embodiment, the associated permissions of the customized replacement role are determined according to a least-privilege security policy.

According to another disclosed embodiment, there may be a computer-implemented method for securing the use of temporary access tokens in network environments. The method may comprise identifying a request from a network identity for an action involving a target network resource, which may require a temporary access token. The method may further comprise performing, based on a security policy, at least one of storing the temporary access token separate from the network identity and providing the network identity with a customized replacement token having an attribute different from the temporary access token, or creating a customized replacement role for the network identity, the customized replacement role having associated permissions that are customized for the network identity based on the request.

According to a disclosed embodiment, the method may further comprise archiving activity of the network identity using the temporary access token.

According to a disclosed embodiment, the method may further comprise archiving activity of a plurality of network identities using a plurality of temporary access tokens.

According to a disclosed embodiment, the method may further comprise analyzing the archived activity of the plurality of network identities to identify potentially malicious use of the plurality of temporary access tokens.

According to a disclosed embodiment, the analyzing may be based on a trained machine learning technique.

According to a disclosed embodiment, the method may further comprise upon identifying potentially malicious use of a particular of the plurality of temporary access tokens, performing at least one of: disabling the particular temporary access token, revoking the particular temporary access token, generating an alert regarding the particular temporary access token, or monitoring activity involving the particular temporary access token.

According to a disclosed embodiment, the potentially malicious use of the plurality of temporary access tokens may include creating new temporary access tokens.

According to a disclosed embodiment, the potentially malicious use of the plurality of temporary access tokens may include making requests to the target network resource from different network addresses.

According to a disclosed embodiment, the method may be performed by a proxy server configured to intercept communications from the network identity to the target network resource.

According to a disclosed embodiment, the method may be performed by a server common to a network environment of the target network resource.

According to a disclosed embodiment, the method may further comprise generating a replacement role temporary token associated with the replacement role. Generating the replacement role temporary token comprises at least one of: generating the replacement role temporary token based on a token generating algorithm; or transmitting a request to the target network resource to generate the replacement role temporary token.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1A:
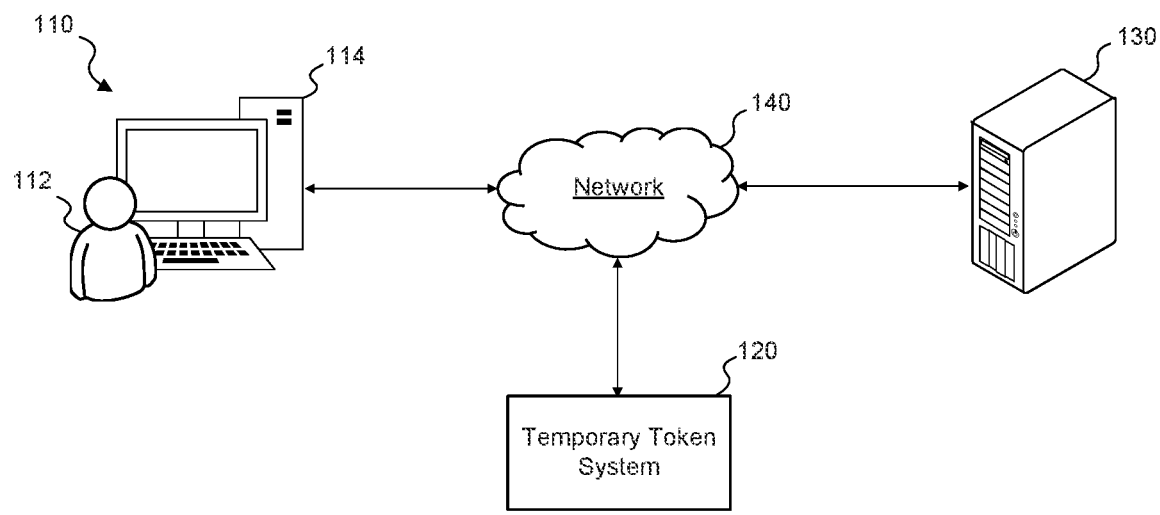
FIGS. 1A and 1B illustrate an example network environment for securing the use of temporary access tokens in network environments, consistent with the disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for securing the use of temporary access tokens in network environments described herein overcome several technological problems relating to security, efficiency, and functionality in the fields of cybersecurity and network communications. The disclosed embodiments provide techniques for securely and efficiently managing the use of temporary access tokens within a network environment. In some embodiments, a temporary token system may be implemented as a server or agent within the network. The system may be configured to monitor all traffic within a network pertaining to the use of temporary access tokens, such that the activity may be monitored to identify anomalous and/or potentially malicious use. For example, the system may be configured to detect the use of one temporary access token to generate a second temporary access token. If an attacker were able to generate a temporary access token in this manner, it could create a chain of temporary access tokens, effectively allowing for a permanent access token within the network. Moreover, any activity associated with the cascading use of these tokens may be difficult to track and often is not detected until after an attack is complete. Accordingly, the temporary token system may flag the use of one temporary access tokens to generate additional temporary access tokens as potentially malicious. As another example, the temporary token system may detect the use of a temporary access token originating from an unexpected location (e.g., an unexpected source country, an unexpected IP address, etc.), which may indicate the token has been compromised.

Further, the temporary token system may play an active role in the provisioning of temporary access tokens and/or roles associated with those tokens. For example, the temporary token system may act as an intermediary (e.g., as a proxy server, etc.) during the creation of temporary tokens. The temporary token system may replace original tokens generated at a restricted network resource with customized replacement tokens and provide the customized replacement tokens to the requesting entity. Accordingly, tokens that may be used directly with the restricted resource may not be transmitted to the requesting identity, thereby reducing the risk of the tokens being misappropriated. Further, this ensures that all token activity is directed through the temporary token system for monitoring.

As another example, the temporary token system may generate customized replacement roles with additional restrictions over a role that is being requested. For example, use of a temporary token associated with the role may be conditioned based on attributes of the request (e.g., an IP address of the requesting identity, etc.). This may allow more robust and fine-tuned control over roles within a network environment, thereby improving efficiency, security, and/or functionality of the network.

Reference will now be made in detail to the disclosed embodiments, examples of which are illustrated in the accompanying drawings.

Figure 1B:
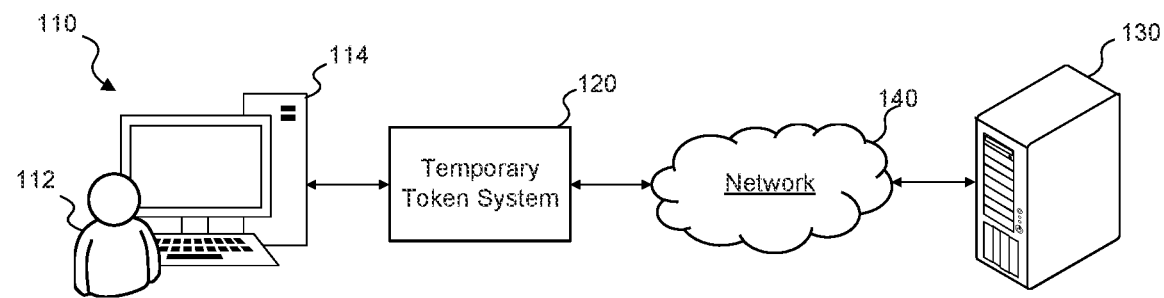

FIGS. 1A and 1B illustrate an example network environment 100 for securing the use of temporary access tokens in network environments, consistent with the disclosed embodiments. Network environment 100 may include one or more network entities 110, one or more target network resources 130, and a temporary token system 120, as shown in FIG. 1A. Network environment 100 may represent a network environment that uses temporary tokens for controlling access by network identities to controlled network resources. For example, temporary security credentials may be provided in the form of temporary tokens to network identity 110 for accessing target network resource 130.

The various components may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., BLUETOOTH, infrared, etc.), or various other types of network communications. In some embodiments, the communications may take place across two or more of these forms of networks and protocols. While network environment 100 is shown as a network-based environment, it is understood that the disclosed systems and methods may also be used in a localized system, with one or more of the components communicating directly with each other.

Network identities, such as network identity 110, may communicate with a target network resource 130 through network 140. As used herein, a network identity may refer to any identity that may be provided access or that may request access to a secured resource, such as target network resource 130. In some embodiments, network identity 110 may refer to a particular user or account (e.g., data and/or instructions representing an individual or service account). For example, network identity 110 may include a user 112, as shown in FIG. 1A. User 112 may be associated with one or more credentials for accessing target network resource 130. User 112 may be provided with or may request temporary access tokens for accessing target network resource 130.

In some embodiments, network identity 110 may refer to a specific device, such as client device 114 shown in FIG. 1A, or an application residing thereon. Client device 114 may be associated with one or more credentials for accessing target network resource 130 and may be provided temporary access tokens. In some embodiments, user 112 may access target network resource 130 through client device 114. Client device 114 may include any computing device, such as a desktop or laptop computer or a mobile device (e.g., a mobile phone or tablet) with network communications capabilities. Client device 114 may also include a number of other devices, including wearable devices (smart watches, smart jewelry, implantable devices, fitness trackers, smart clothing, or head-mounted displays, etc.) or IoT devices (e.g., smart home devices, industrial devices, etc.) that may communicate with target network resource 130. In some embodiments, network identity 110 may comprise a virtual machine. For example, network environment 100 may include a cloud computing platform, such as Amazon Web Services (AWS™) and network identity 110 may comprise an Elastic Compute Cloud (EC2™) instance, or a similar form of virtual machine. Consistent with the present disclosure, network identity 110 may refer to other entities, such as a particular software application, a service deployed in network 140, or any other entities that may communicate with a target network resource 130.

Network identity 110 may request access to one or more network resources, such as target network resource 130. As used herein, a target network resource 130 may refer to any resource that may be the subject of access requests within a network. Examples of network resources may include SQL servers, databases or data structures holding confidential information, restricted-use applications, operating system directory services, access-restricted cloud-computing resources (e.g., an AWS™ or Azure™ server), sensitive IoT equipment (e.g., physical access control devices, video surveillance equipment, etc.) and/or any other computer-based equipment or software that may be accessible over a network.

In some embodiments, target network resource 130 may be a privileged resource, such that access to the network resource may be limited or restricted. For example, access to the requested resource may require a privileged credential (e.g., a password, a username, an SSH key, an asymmetric key, a security or access token, etc.). As described above, target network resource 130 may be configured to provide temporary access tokens to one or more network identities for access to the network resource. As used herein, a temporary access token may be any security object that allows limited access to a restricted network resource. For example, the access may be limited to a particular time (e.g., may expire after a predetermined period of time has elapsed) or for a particular purpose (e.g., may expire after a requested action or series of actions is complete). The temporary access token may be provided as part of a service for requesting temporary access credentials for a privileged resource. For example, the temporary access token may be provided by a web service, such as an AWS Security Token Service (STS™). The temporary access token may comprise information including an identifier, the identity of a network identity (e.g., an account or user), an identifier of an associated session, security credentials for the network identity, privileges of the network identity, and/or other information associated with the network identity and/or network resource.

If access to the target network resource 130 is granted, the network identity 110 may be asked to provide the temporary access token to perform actions associated with the network resource 130. For example, network identity 110 may request a temporary access token from target network resource 130 and may later access target network resource 130 using the token. In some embodiments, a temporary access token may be associated with a particular role. For example, the role may define a number of privileges or permissions that a network identity associated with the role is authorized to performed. The present disclosure is not limited to any particular type of token or security object. For example, tokens may be JSON Web Tokens (JWT), opaque access tokens, etc.

Network environment 100 may also include a temporary token system 120, as shown in FIG. 1A. Temporary token system 120 may be configured to perform various network security enhancements associated with temporary tokens for network environment 100. For example, temporary token system 120 may monitor and/or audit temporary token usage within network environment 100. Temporary token system 120 may be configured to analyze the temporary token usage to identify potential malicious activity. In some embodiments, temporary token system 120 may further be configured to manage and/or enforce temporary tokens, including validating temporary access token requests and/or generating, storing, and/or transmitting temporary access tokens. In some embodiments, temporary token system 120 may perform control actions, such as blocking access, revoking or suspending temporary access tokens, generating alerts, modifying roles, or various other control actions. Examples of particular processes that may be performed by temporary token system 120 are described in greater detail below.

Temporary token system 120 may be implemented in a variety of ways. For example, temporary token system 120 may be implemented as a separate system configured to monitor and/or control activities within network 140. In such embodiments, temporary token system 120 may include dedicated components such as a memory, processor, server, operating system, etc. for carrying out the processes described below. In other embodiments, temporary token system 120 may operate as a service within network 140 for monitoring and/or controlling various aspects of the provisioning and validation of temporary tokens.

In some embodiments, temporary token system 120 may be implemented as an intermediary between network identity 110 and target network resource 130, as illustrated in FIG. 1B. For example, temporary token system 120 may be implemented as a proxy server or agent within network environment 100. Accordingly, some or all of the communication traffic between network identity 110 and target resource 130 may be directed through temporary token system 120. In some embodiments, temporary token system 120 may be a separate server, such as a proxy server configured to monitor and process requests and other communications between network identity 110 and target network resource 130. In some embodiments, temporary token system 120 may be implemented as a web-based service, such as CyberArk™ Privileged Session Manager (PSM) for Web, or similar services. While temporary token system 120 is shown in FIG. 1B as an interface between network identity 110 and network 140, it is understood that temporary token system 120 may be implemented anywhere in network environment 100 such that it is functionally located between network identity 110 and target network resource 130. For example, temporary token system 120 may be implemented as an intermediary server on the server side (e.g., between network 140 and target network resource 130).

Further, in some embodiments, temporary token system 120 may be deployed on various other elements of network environment 100. For example, temporary token system 120 may be deployed on an endpoint, such as on network identity 110. Temporary token system 120 may be implemented as an agent or executable software application running within an operating system or application of network identity 110. Temporary token system 120 may monitor and/or intercept actions or commands associated with temporary tokens that are executed on client device 114. Similarly, temporary token system 120 may also be deployed as an agent or software application running on a target endpoint resource, such as target network resource 130. Accordingly, some or all of the processes or operations performed by temporary token system 120 may be performed by other entities within network environment 100, including target network resource 130.

Figure 2:
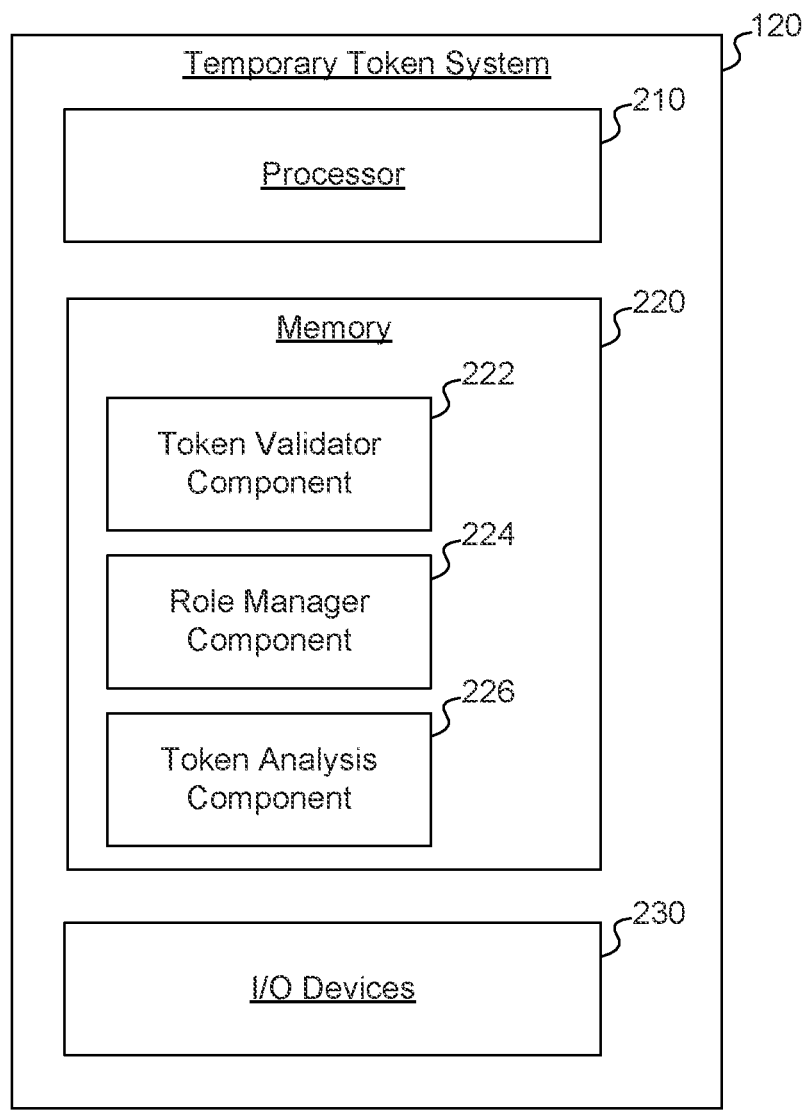
FIG. 2 is a block diagram showing an example temporary token system, consistent with the disclosed embodiments.

FIG. 2 is a block diagram showing an example temporary token system 120, consistent with the disclosed embodiments. Consistent with embodiments of the present disclosure, temporary token system 120 may be a computing device (e.g., a server, etc.) and may include one or more dedicated processors and/or memories. For example, temporary token system 120 may include a processor (or multiple processors) 210, a memory (or multiple memories) 220, and/or one or more input/output (I/O) devices 230, as shown in FIG. 2.

Processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. The disclosed embodiments are not limited to any type of processor configured in temporary token system 120.

Memory 220 may include one or more storage devices configured to store instructions used by the processor 210 to perform functions related to the disclosed embodiments. Memory 220 may be configured to store software instructions, such as programs, that perform one or more operations when executed by the processor 210 to securely obtain data, for example, using process 600, described in detail below. The disclosed embodiments are not limited to particular software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from temporary token system 120. Furthermore, the memory 220 may include one or more storage devices configured to store data for use by the programs.

I/O devices 230 may include one or more network adaptors or communication devices and/or interfaces (e.g., WIFI, BLUETOOTH, RFID, NFC, RF, infrared, Ethernet, etc.) to communicate with other machines and devices, such as with other components of network environment 100 through network 140. For example, temporary token system 120 may use a network adaptor to receive and transmit communications pertaining to temporary access tokens within network environment 100. In some embodiments, I/O devices 230 may also include interface devices for interfacing with a user of temporary token system 120. For example, I/O devices 230 may comprise a display, touchscreen, keyboard, mouse, trackball, touch pad, stylus, printer, or the like, configured to allow a user to interact with temporary token system 120.

Temporary token system 120 may further comprise one or more components for performing various operations of the disclosed embodiments. For example, temporary token system 120 may include a token validator component 222, a role manager component 224, and/or a token analysis component 226. Token validator component 222 may comprise instructions for monitoring, validating, and/or enforcing security policies for temporary token usage. For example, where temporary token system 120 is implemented as a proxy server or service, token validator component may include instructions for monitoring and/or managing token requests. Token validator component 222 may include instructions for performing some or all of process 300 described in greater detail below with respect to FIG. 3.

Role manager component 224 may comprise instructions for managing temporary token assignments for particular roles. This may provide an additional layer of security over traditional temporary tokens by providing conditional access enforcement for the temporary tokens. For example, role manager component 224 may include instructions for creating an on-demand replication of a requested role with a set of use restrictions. Role manager component 224 may include instructions for performing some or all of the actions associated with temporary token system 120 in process 400 described in greater detail below with respect to FIG. 4.

Token analysis component 226 may comprise instructions for observing and analyzing roles and temporary token logs to detect anomalies and malicious events in temporary token usage. For example, token analysis component 226 may access and analyze logs and other data associated with temporary token usage in network environment 100. Token analysis component 226 may include instructions for performing some or all of the actions associated with temporary token system 120 in process 500 described in greater detail below with respect to FIG. 5.

While token validator component 222, role manager component 224, and token analysis component 226 are shown as separate components, in some embodiments they may not be implemented separately within memory 220. Further, temporary token system 120 may not include all of components 222, 224, and 226 and may include a subset of these components, depending on how temporary token system 120 is implemented within network environment 100. Further, while temporary token system 120 is shown as having dedicated processor 210 and memory 220, in some embodiments, temporary token system 120 itself may be integrated into various other components in network environment 100, as described above. For example, processor 210 and/or memory 220 may correspond to a processor and memory devices of another component in network environment 100, such as network identity 110 and/or target network resource 130. In such embodiments, temporary token system 120 may be executed as software code, a script, or an application within these network entities.

Figure 3:
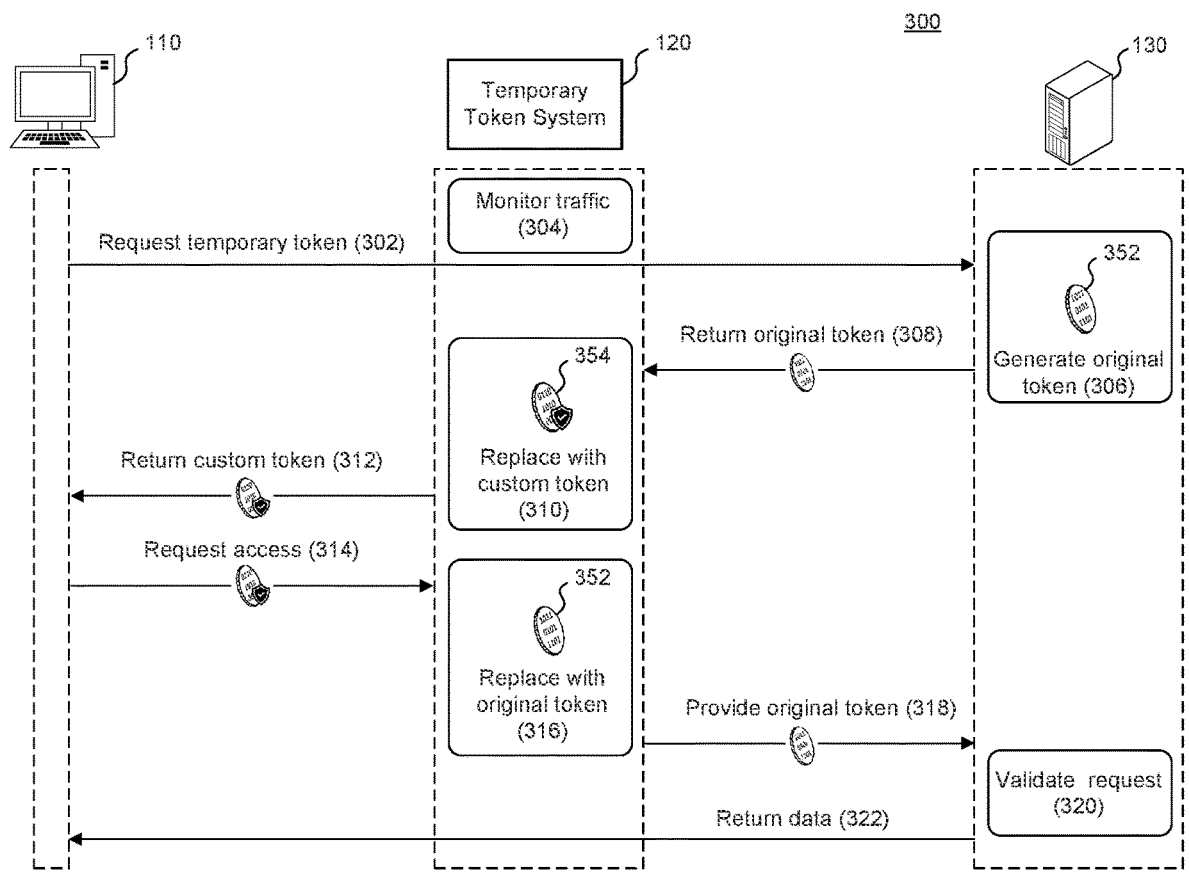
FIG. 3 is a block flow diagram illustrating an example process for validating tokens within a network environment, consistent with the disclosed embodiments.

FIG. 3 is a block flow diagram illustrating an example process 300 for validating tokens within a network environment, consistent with the disclosed embodiments. Process 300 may provide visibility, control, and/or enforcement capabilities in a network environment involving the use of temporary tokens. In some embodiments, temporary token system 120 may be implemented as a proxy server or service to enable process 300, as described above. For example, temporary token system 120 may be a full proxy which audits and monitors all communications between network identity 110 and target network resource 130, including requests containing temporary access tokens or requests for creation of temporary access tokens. It is understood, however, that temporary token system 120 may be implemented in various other forms, as described above. In some embodiments, process 300 may be implemented such that it occurs transparently with respect to network identity 110 and/or target network resource 130. In other words, process 300 may appear to one or both of network identity 110 and/or target network resource 130 as if they are communicating directly with each other and the steps performed by temporary token system 120 may not be perceptible to these endpoints.

In step 302, network identity 110 may request a temporary access token for accessing target network resource 130. In some embodiments, the request may be directed to target network resource 130 and may be passed through temporary token system 120. For example, temporary token system 120 may be configured to monitor requests and other communications between network identity 110. In some embodiments, the request may instead be directed to temporary token system 120. For example, temporary token system 120 may be implemented as a proxy server and network identity 110 may direct requests to access target network resource 130 to temporary token system 120. The request provided in step 302 may include information associated with network identity 110 that may be used to determine whether to authorize the request. For example, the request may include information identifying network identity 110, credentials associated with network identity 110 (e.g., a username, a password, a symmetric or asymmetric key, etc.), a purpose of the request (e.g., an action to be performed, or other information).

As shown by step 304 in FIG. 3, temporary token system 304 may monitor traffic between network identity 110 and target network resource 130. Temporary token system 120 may therefore be configured such that any network traffic pertaining to the use of temporary access tokens passes through or is accessible by temporary token system 120. Thus, temporary token system 120 may monitor every action involving temporary access tokens, including requests to create a temporary access token (e.g., step 302), or requests to perform actions involving target network resource 130 that require a temporary access token (e.g., step 314, described below). By monitoring this activity, temporary token system 120 may detect suspicious events associated with the use of temporary access tokens and block and/or report the activity.

In some embodiments, temporary token system 120 may identify suspicious activity based on a security policy. As used herein, a security policy may be any set of rules or constraints that define acceptable or expected actions (or prohibited actions) within a network environment. The security policy may define a set of constraints on actions that may be taken by network identities, such as network identity 110. The security policy may be stored in a network location that is accessible to temporary token system 120. In some embodiments, the security policy may be stored locally to temporary token system 120, for example, in memory 220. In other embodiments, the security policy may be stored externally, for example in a cloud storage location, on a network database, on a web security platform, on target network resource 130, on network identity 110, or any other location accessible via network 140.

Temporary token system 120 may identify suspicious activity based on the security policy. Actions that do not comply with the security policy may be identified as suspicious or malicious activity. An example of suspicious activity may include an indication that a temporary token associated with a particular network identity is used by another network identity. For example, a temporary access token created for a particular virtual machine instance (e.g., an EC2™ machine) may be used outside of the machine (e.g., used by a different IP address than the EC2™ machine). This may indicate that the temporary access token has been compromised and thus may be flagged as suspicious or malicious. As another example, a temporary access token that is used to create another temporary access token may be identified as suspicious. For example, if a temporary access token is used to create another temporary access token, this may result in a chain of temporary access tokens, which may effectively create a permanent access token and may make use of the tokens difficult to track.

Temporary token system 120 may be configured to perform one or more control actions associated with the suspicious activity. For example, temporary token system 120 may be configured to block access to target network resource 130, for example, by revoking or suspending a temporary access token, or denying an access request. In some embodiments, temporary token system 120 may be configured to generate an alert of the suspicious activity. For example, temporary token system 120 may alert a system administrator or other entity associated with network environment 100.

In accordance with embodiments of the present disclosure, temporary token system 120 may be configured to actively manage temporary access token traffic and replace temporary access tokens within communications between network identity 110 and target network resource 130. For example, as shown in step 306, in response to the request from step 302, target network resource 130 may generate an original token 352. Consistent with the disclosed embodiments, original token 352 may be a temporary access token, as described above. In embodiments where network environment 100 is an AWS™ environment, original token 352 may be created by an AWS Security Token Service (STS™). In some embodiments, step 306 may include authenticating network identity 110. For example, if the request provided in step 302 includes security credentials, step 306 may include authenticating network identity 110 based on the security credentials. In other embodiments, target network resource 130 may generate original token 352 based on the identity of network identity 110 or other information associated with the request.

In step 308, target network resource 130 may return original token 352. In some embodiments, target network resource 130 may send original token 352 directly to temporary token system 120 (e.g., where temporary token system 120 is implemented as a proxy server). In other embodiments, target network resource 130 may direct original token 352 to network identity 110 and temporary token system 120 may intercept original token 352.

In step 310, temporary token system 120 may be configured to replace original token 352 with a customized replacement token 354. Customized replacement token 354 may have at least one attribute that is different from original token 352 such that customized replacement token 354 may not be used directly with target network resource 130. For example, generating customized replacement token 354 may comprise replacing or modifying a portion of original token 352 with customized data (e.g., a random or semi-random string, etc.). In other embodiments, generating customized replacement token 354 may comprise generating a new, separate token that is independent from original token 352. In some embodiments, customized replacement token 354 may include the same restrictions as original token 352. For example, if original token 352 is valid for a predetermined period of time, customized replacement token 354 may have the same time restrictions. In other embodiments, customized replacement token 354 may have different or additional restrictions than original token 352. For example, customized replacement token 354 may be valid for a shorter period of time than original token 352 or may impose additional use limitations. In some embodiments, the restrictions on customized replacement token 354 may be determined by one or more security policies. In some embodiments, step 310 may further comprise storing original access token 352 separate from network identity 110. For example, original token 352 may be stored in a memory (e.g., memory 220), a database, or network location that is accessible to temporary token system 120 but inaccessible to network identity 110. Accordingly, original token 352 may not have access to network identity 110 or other entities within network environment 100.

In step 312, temporary token system 120 may return customized replacement token 354 to network identity 110. In some embodiments, customized replacement token 354 may appear as if it were original token 352 provided by target network resource 130. For example, customized replacement token 354 may mimic one or more structural features or other attributes of original token 352 such that it may be indistinguishable from a temporary access token issued by target network resource 130. Thus, in some embodiments, it may appear to network identity 110 that it has requested and received a temporary access token directly from target network resource 130. In other embodiments, network identity 110 may communicate directly with temporary token system 120.

To access target network resource 130, network identity 110 may return customized replacement token 354. For example, in step 314, network identity 110 may request access to target network resource 130. The requested access in step 314 may include any operation requiring privileged access to target network resource 130. For example, the request may include a read request in which network identity 110 requests access to data associated with target network resource 130 (e.g., stored in a memory or database of target network resource 130, etc.). In other embodiments, the request may include a write request, in which network identity 110 is requesting privileges to modify or write data on target network resource 130. Various other forms of requests may also be provided in step 314, including those defined by the AWS™ architecture. The request may include customized replacement token 354, as shown in FIG. 3. Similar to the request in step 302, the request in step 314 may be directed to target network resource 130 or may be sent directly to temporary token system 120.

In step 316, temporary token system 120 may replace customized replacement token 354 received from network identity 110 with original token 352. Accordingly, step 316 may include retrieving original token 316 from a remote storage location. In some embodiments, step 316 may further include validating the request, which may comprise verifying that the request includes the correct customized replacement token 354, verifying an identity of network identity 110, etc. In some embodiments, temporary token system 120 may monitor the use of customized replacement token 354 to identify anomalous or potentially malicious activity, as described above. For example, temporary token system 120 may monitor temporary token activity according to a security policy. In the event that potentially malicious activity is detected, temporary token system 120 may deny the request sent in step 314 and/or perform one or more control actions.

If the request is validated in step 316, temporary token system 120 may send original token 352 to target network resource 130 in step 318. Temporary token system 120 may include some or all of the information from the request provided in step 314. For example, temporary token system 120 may forward the request received as part of step 314 and replace customized replacement token 354 with original token 352. In some embodiments, temporary token system 120 may include additional information in the request (e.g., indicating that the request has been validated at temporary token system 120, etc.).

In step 320, target network resource 130 may validate the request based on original token 318. If the request is validated, target network resource 130 may return the requested data (or otherwise allow the requested action) in step 322. The data may be returned directly to network identity 110 or may be returned to temporary token system 120 and then forwarded to network identity 110.

Process 300 may therefore provide improved security through the implementation of temporary token system 120. By replacing original token 352 with customized replacement token 354, only temporary token system 120 has access to original token 352 and network identity 110 has access only to customized replacement token 354. Thus, the risk of temporary access tokens being stolen or leaked is reduced because the customized replacement token 354 cannot be used directly with target network resource 130. Further, this ensures that all network traffic involving temporary access tokens may be passed through temporary token system 120 such that it may be monitored and analyzed for suspicious or anomalous behavior.

Figure 4:
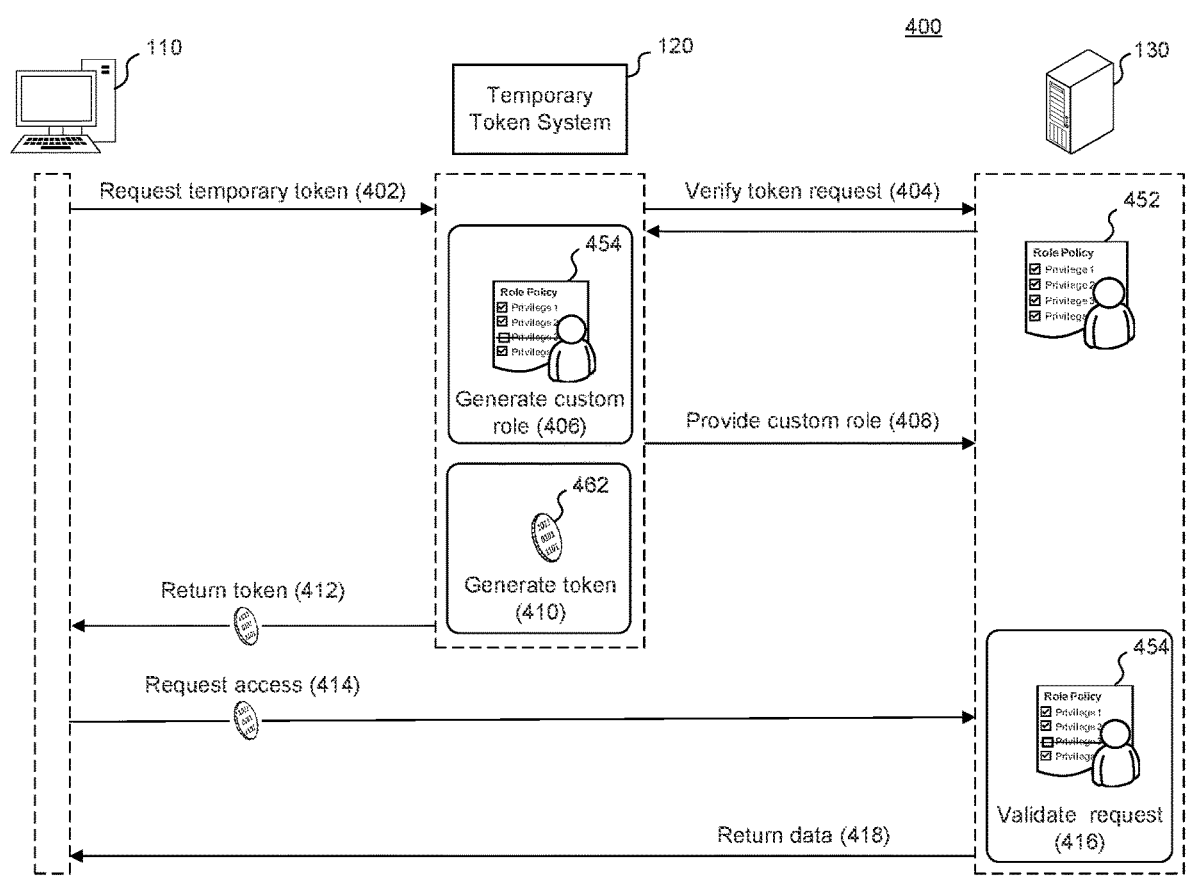
FIG. 4 is a block flow diagram illustrating an example process for conditional access enforcement for temporary access tokens, consistent with the disclosed embodiments.

In accordance with some embodiments of the present disclosure, temporary token system 120 may be configured to manage temporary access token assignments and provide conditional access enforcement for the temporary access tokens. FIG. 4 is a block flow diagram illustrating an example process 400 for conditional access enforcement for temporary access tokens, consistent with the disclosed embodiments. As described above, temporary token system 120 may be functionally located between network identity 110 and target network resource 130. Temporary token system 120 maybe implemented as a proxy server or agent, or may be implemented as a standalone server or service.

In step 402, network identity 110 may request a temporary access token to access target network resource 130. The request may be the same as or similar to the request in step 302, described above. In some embodiments, the request may be directed to temporary token system 120. In other embodiments, the request may be directed to target network resource 130 and may be intercepted by temporary token system 120. Accordingly, in some embodiments, process 400 may be performed transparently to network identity 110, similar to process 300.

In some embodiments, the request in step 402 may be associated with a particular role 452 that is defined within network environment 100. The role may be associated with a predefined set of permissions or privileges that a user or other network identity may perform with a temporary access token provisioned based on this role. For example, where network environment 100 is configured according to the AWS EC2™ service, role 452 may correspond to an Identity and Access Management (IAM™) Role defined within the service. The request may be a request for a temporary access token for the particular role.

At step 404, temporary token system 120 may verify the temporary access token request with target network resource 130. For example, target network resource 130 may confirm that network identity 110 has access to role 452. In some embodiments, temporary token system 120 may verify whether network identity 110 has access to role 452 based on a set of rules or conditions (e.g., according to a security policy) stored locally to temporary token system 120.

If network identity 110 is authorized for the requested temporary token, in step 406, temporary token system 120 may generate a customized replacement role 454. Customized replacement role 454 may be a replication of requested role 452, with a set of conditional use restrictions. In some embodiments the conditional use restrictions may be a limitation on the actions that may be performed using the requested role. Accordingly, temporary token system 120 may generate customized replacement role 454 with reduced or limited permissions over those defined in requested role 452. In some embodiments, the use restrictions may be conditioned based on information associated with the requester, such as the requester's source country, IP address, user agent, or other information included in an access request. The conditions may apply to all permissions within customized replacement role 454, or may apply to individual permissions defined in the role.

In some embodiments, when generating customized replacement role 454, temporary token system 120 may determine which use restrictions to apply based on information included in the request. For example, based on the requester's source country, IP address, user agent, or other information included in an access request, temporary token system 120 may determine which restrictions to apply. Therefore, the customized replacement role 454 may be determined dynamically such that it is unique to the individual request. In some embodiments, temporary token system 120 may determine which use restrictions to apply based on a security policy, which may be defined by an organization associated with target network resource 130.

As an illustrative example, where network 100 corresponds to an AWS EC2™ environment, network identity 110 may request a role named "EC2admin," which may provide full permissions for the EC2™ service. For example, a user assuming the EC2admin role may have access to create, delete, or change any of the EC2™ virtual machine instances within network environment 100. Using temporary token system 120, an organization may modify and restrict the permissions associated with the EC2admin role according to a defined security policy (e.g., a conditional access policy). For example, the security policy may define that request from network identities outside a company's IP range may be provided temporary tokens associated with a limited EC2admin role, which may omit some of the privileges of the full EC2admin role. Accordingly, only a network identity requesting the EC2admin role from within the organization's IP range will have access to the full EC2 admin role. While an AWS™ server is used by way of example, it is understood that the disclosed embodiments are not limited to any particular network environment or target network resource.

In step 408, temporary token system 120 may provide customized replacement role 454 to target network resource 130. Target network resource 130 may store the customized replacement role 454 for later authentication of network identities. In step 410, temporary token system 120 may generate a temporary token 462 based on customized replacement role 406. In some embodiments, temporary token 462 may be generated by temporary token system 120, as illustrated in FIG. 4. Accordingly, temporary token system 120 may access at least one temporary token generation algorithm, which, in some embodiments, may be the same temporary token generating algorithm used to generate temporary tokens by target network resource 130. In other embodiments, temporary token 462 may be generated by target network resource 130. Accordingly, step 410 may include transmitting, from temporary token system 120 to target network resource 130, a request for generating temporary token 462. Step 410 may further include receiving temporary token 462 from target network resource 130.

Temporary token 462 may then be returned to network identity 110 in step 412. As with step 312, described above, temporary token 462 may appear as if it were an original temporary token provided by target network resource 130. For example, temporary token 462 may mimic one or more structural features or other attributes of a token provisioned by target network resource 130. Further, temporary token 462 may not indicate that it is associated with a limited replacement role. Thus, in some embodiments, it may appear to network identity 110 that it has requested and received a temporary access token directly from target network resource 130 for the requested role. In other embodiments, network identity 110 may communicate directly with temporary token system 120 and may be notified of the limitations associated with customized replacement role 454.

At step 414, network identity 110 may request access to target network resource 130. The request may include customized replacement token 454, as shown in FIG. 4. Notably, unlike with process 300, requests in step 414 may be made directly to target network resource 130 without being monitored or processed by temporary token system 120. Therefore, temporary token system 120 does not need to be implemented as a full proxy server or agent. At step 416, target network resource 130 may validate the request received through step 414 based on customized replacement policy 454. For example, as described above, validation of the request may be conditioned on information included in the request. For example, if the request originates from an IP address, source country, or user agent that is outside of a predefined list or range, or that differs from the information associated with the original request, target network resource 130 may deny the request. Otherwise, if the request is validated, target network resource 130 may return the requested data (or allow the requested action) in step 418.

Accordingly, process 400 may provide improved security through the implementation of temporary token system 120. For example, if a temporary token is lost or stolen, the token may blocked if it is not used according to the organization's security policy (e.g., based on an IP address restriction, etc.). Further, process 400 provides additional flexibility as the network identity 110 is not required to interact with a proxy server and can communicate directly with target network resource 130 for access requests using temporary token 462.

Figure 5:
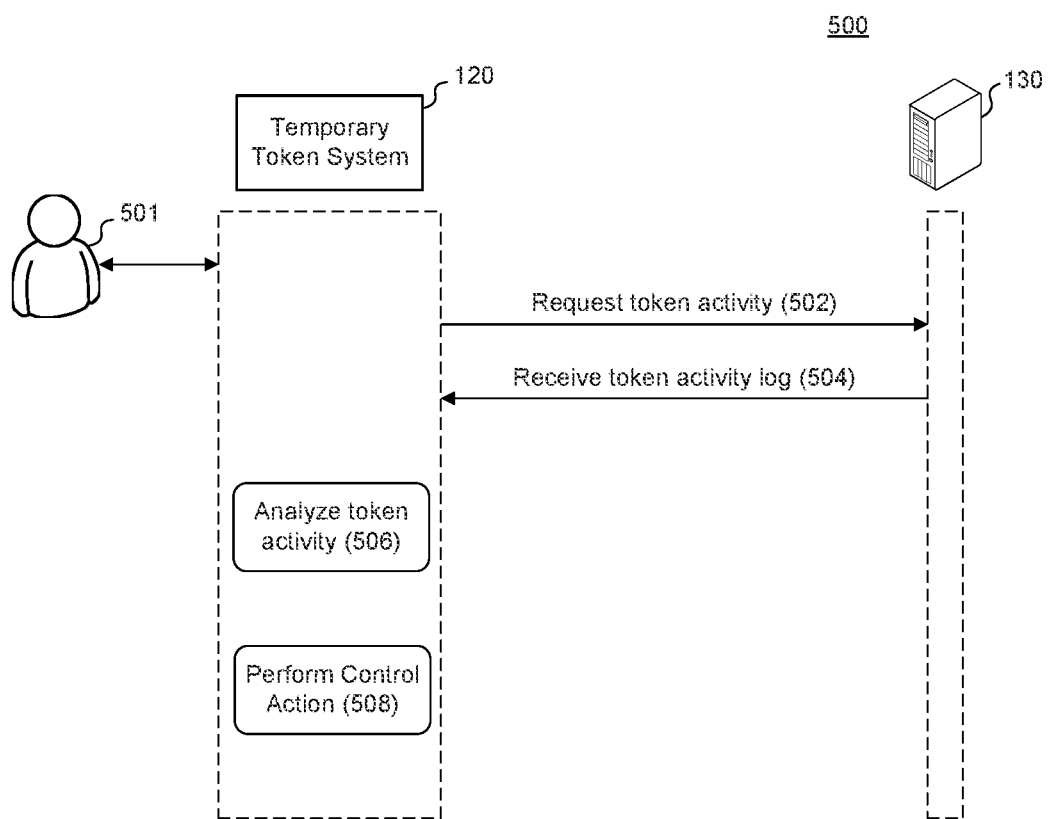
FIG. 5 is a block flow diagram illustrating an example process for detecting malicious events in temporary token usage based on analysis of roles and logs in a network environment, consistent with the disclosed embodiments.

In some embodiments, temporary token system 120 may be implemented as a service that may be used to observe and analyze activity logs of network environment 100 to detect temporary access token usage and malicious actions associated with the tokens. FIG. 5 is a block flow diagram illustrating an example process 500 for detecting malicious events in temporary token usage based on analysis of roles and logs in a network environment, consistent with the disclosed embodiments.

In step 502, temporary token system 120 may request token activity from target network resource 130. In some embodiments, the request may be part of a regular audit process. For example, the request may occur automatically at set time intervals (e.g., at a predetermined number of seconds, minutes, hours, days, etc.); as part of a security or maintenance routine, or based on other criteria. In some embodiments, the request may be generated based on an indication of suspicious or malicious activity elsewhere within network environment 100. Temporary token system 120 may be configured to interact with a user, such as user 501 shown in FIG. 5. User 501 may access information about the usage of temporary access tokens within network environment 100 and perform analytics pertaining to the use of these tokens through temporary token system 120. For example, user 501 may interface with temporary token system 120 through I/O devices 230, described above. Accordingly, the request may be triggered by an input of user 501.

In response to the request, in step 504, temporary token system 120 may receive a token activity log comprising information about the usage of temporary tokens within network environment 100. In some embodiments, the token activity log may comprise all communications and/or activity occurring within network environment 100. Alternatively, the activity log may be filtered to include a subset of the communications or activity, such as activity pertaining to the usage of temporary tokens. In some embodiments, the log may be limited to a particular time, such as a predetermined time frame (e.g., the past 24 hours, past week, etc.), activity since the last request was sent, a time frame defined in the request in step 502, etc.

In step 506, temporary token system 120 may analyze the token activity log received in step 504 to detect anomalies and/or potentially malicious activity. For example, such activity may be detected where a temporary access token created for one network identity (e.g., a particular EC2™ machine) is used by another network identity (e.g., by an entity having a different IP address than the EC2™ machine). As another example, the suspicious activity may be based on the creation of another temporary token using a temporary token, as described above. Suspicious activity may also be detected based on a source country, an IP address, a user-agent, or other information associated with a request. In some embodiments, a security policy may define which activity is suspicious and temporary token system 120 may compare the activity in the activity log to the security policy. In some embodiments, analysis of the activity log may be guided by user 501. For example, user 501 may provide input through I/O devices 230 and may guide some or all of the analysis.

Consistent with some aspects of the present disclosure, analysis of the activity log may be based on a trained machine learning process. For example, a set of activity logs containing temporary token usage in a network, along with identifications of activity or activity logs known to be associated with malicious activity, may be input into a machine learning model as training data. The resulting trained model may be used to analyze the activity logs to identify suspicious or malicious activity. For example, an artificial neural network configured to identify malicious use of temporary access tokens may be used to analyze the activity logs in step 506. Various other machine learning algorithms may be used, including a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, a gradient boosting algorithm, a deep learning model, or any other form of machine learning model or algorithm.

In some embodiments, temporary token system 120 may further be configured to perform one or more control actions, as illustrated by step 508 in FIG. 5. As used herein, a control action may be any action taken in response to a detection of malicious or anomalous temporary token activity. In some embodiments, temporary token system 120 may generate one or more alerts identifying the detected activity. For example, an alert may be transmitted to an owner of network environment 100 or target network resource 130 (e.g., an organization, user 501, etc.). The alert may further include recommendations for addressing the problems that have been identified, such as revoking or blocking a temporary access token, updating a security policy, modifying or removing one or more roles associated with the temporary access token, modifying privileges for a user or other network identity, rotating a privileged credential for the user or network identity, or various other actions that may mitigate the detected threat. Additionally, or alternatively, temporary token system 120 may automatically perform one or more of these control actions based on the identified threat.

In some embodiments, the activity log may include information regarding the configuration of one or more roles within network environment 100. Accordingly, step 506 may further include analyzing the permissions associated with these roles and determining which network identities are associated with the various roles and/or permissions. Temporary token system 120 may provide recommendations for modifying these roles, for example, by suggesting conditional use restrictions or limited privileges, as described above with respect to FIG. 4. User 501 may be able to monitor and analyze these roles through temporary token system 120.

Figure 6:
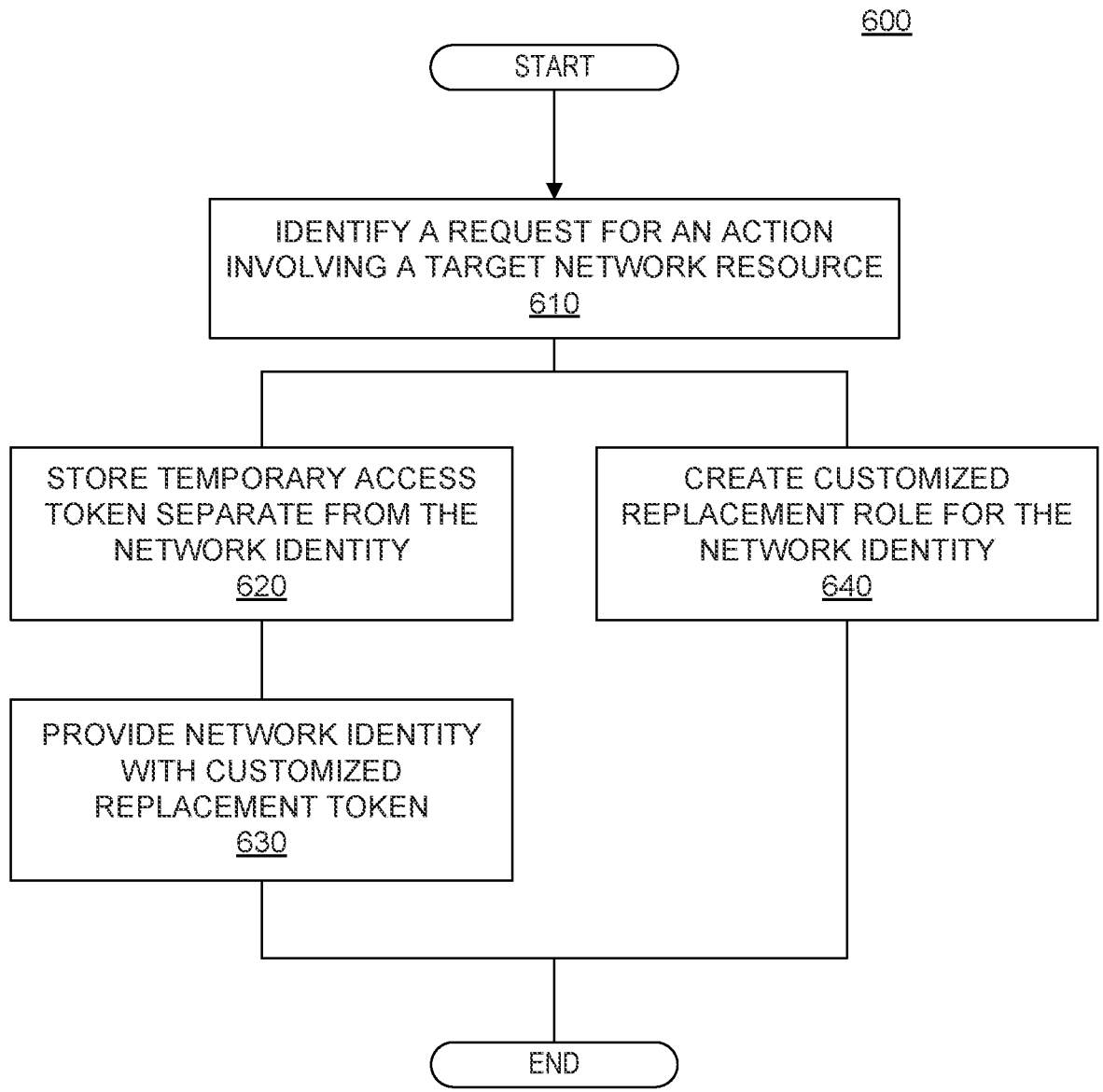
FIG. 6 is a flowchart depicting an example process for securing the use of temporary access tokens in network environments, consistent with the disclosed embodiments.

FIG. 6 is a flowchart depicting an example process 600 for securing the use of temporary access tokens in network environments, consistent with the disclosed embodiments. Process 600 may be performed by at least one processing device, such as processor 210, as described above. It is to be understood that throughout this disclosure, the term "processor" is used as a shorthand for "at least one processor." In other words, a processor may include one or more structures that perform logic operations whether such structures are collocated, connected, or disbursed. In some embodiments, a non-transitory computer readable medium may contain instructions that when executed by a processor cause the processor to perform process 600. Process 600 is not necessarily limited to the steps shown in FIG. 6, and any steps or processes of the various embodiments described throughout the present disclosure may also be included in process 600, including those described above with respect to processes 300, 400, and 500.

At step 610, process 600 may include identifying a request from a network identity for an action involving a target network resource. For example, temporary token system 120 may identify a request from network identity 110 to access target network resource 130, such as the requests transmitted in steps 302 and 402 described above with respect to FIGS. 3 and 4, respectively. Consistent with the present disclosure, the request may require a temporary access token. For example, target network resource 130 may be a privileged resource such that the action requires use of a temporary access token, as described above. The action may include at least one of: accessing the target network resource 130 or obtaining a role for the network identity 110 to use with the network identity 110.

In some embodiments, process 600 may include accessing a security policy associated with usage of temporary access tokens within the network environment. As described above the security policy may be a set of rules or configurations that define acceptable actions within a network environment. In some embodiments the security policy may be directed specifically to temporary access token usage. The processor performing process 600 may perform one or more actions associated with the temporary access token based on the security policy.

For example, in step 620, process 600 may include storing the temporary access token separate from the network identity 110. For example, as described above with respect to FIG. 3, the temporary access token (which may correspond to original token 352) may be stored in a memory (e.g., memory 220), a database, or network location that is accessible to temporary token system 120 but inaccessible to network identity 110. Accordingly, the temporary access token may not be accessible by network identity 110 or other entities within the network environment.

In step 630, process 600 may further comprise providing the network identity 110 with a customized replacement token. For example, temporary token system 120 may generate customized replacement token 354 and provide it to network identity 110, as described above with respect to FIG. 3. Accordingly, step 630 may further comprise dynamically generating the customized replacement token in response to the request. In some embodiments, the temporary access token may be provided to the network identity 110 on a just-in-time basis. For example, temporary token system 120 may delay providing the customized replacement token to the network identity 110 until it is needed by the network identity 110 (e.g., when the network identity 110 is about to perform the requested action, etc.). As described above, the customized replacement token may have at least one attribute different from the temporary access token such that it may not be used by the network identity to access target network resource 130 directly. In some embodiments, step 630 may comprise replacing the temporary access token with a new version of the temporary access token.

In some embodiments, process 600 may further comprise monitoring use of the customized replacement token. For example, temporary token system 120 may monitor use of the customized replacement token to detect an anomaly in the monitored use or a potentially malicious activity involving the customized replacement token. Examples of these anomalies and/or potentially malicious uses are described in greater detail above with respect to FIG. 3.

The network identity 110 may subsequently use the customized replacement token to access the target network resource 130. Accordingly, process 600 may further comprise receiving an access request from the network identity 110 to access the target network resource 130. For example, as described above with respect to FIG. 3, network identity 110 may provide a request to access target network resource 130 (step 314), which may include the customized replacement token 354. Process 600 may further include asserting the temporary access token to the target network resource 130 on behalf of the network identity 110, as described above with respect to steps 316 and 318.

Based on the security policy, in some embodiments, process 600 may include creating a customized replacement role for the network identity 110, as shown in step 640. This may correspond to various steps of process 400, described in detail above with respect to FIG. 4. The customized replacement role may have associated permissions that are customized for the network identity 110 based on the request. For example, the associated permissions of the customized replacement role may include at least one of: a network address restriction on access to the target network resource (e.g., an IP address associated with the network identity), or a location-based restriction on access to the target network resource (e.g., a source country associated with a request). In some embodiments, the associated permissions of the customized replacement role may be determined according to a least-privilege security policy. For example, the least-privilege security policy may be a security policy restricting the permissions of the customized replacement role to only allow access to the information and resources necessary for a legitimate purpose of the requested role. Thus, based on the customized replacement role, the network identity 110 may be provided only permissions that are essential to perform a requested action or function.

In some embodiments, step 640 may further comprise generating a replacement role temporary token associated with the replacement role (e.g., temporary token 462), as described above with respect to FIG. 4. In some embodiments, the replacement role temporary token may be generated by temporary token system 120. Accordingly, step 640 may comprise generating the replacement role temporary token based on a token generating algorithm, as described above. In other embodiments, the replacement role temporary token may be generated by target network resource 130. Accordingly, step 640 may comprise transmitting a request to the target network resource 130 to generate the replacement role temporary token.

In some embodiments, process 600 may further comprise archiving activity of the network identity 110 using the temporary access token. Accordingly, process 600 may include one or more steps described above with respect to process 500. This may include archiving activity of a plurality of network identities using a plurality of temporary access tokens. In some embodiments, the archiving may be performed by the same entity performing process 600 (e.g., temporary token system 120). In other embodiments, the activity may be archived by another entity within the network environment, such as target network resource 130. Accordingly, process 600 may include requesting the archived activity from target network resource 130 or another network entity.

Process 600 may further comprise analyzing the archived activity of the plurality of network identities to identify potentially malicious use of the plurality of temporary access tokens. As described in greater detail above with respect to process 500, the analyzing may be based on a trained machine learning technique. For example, a set of archived activity or activity logs containing temporary token usage in a network, along with identifications of activity or activity logs known to be associated with malicious activity, may be input into a machine learning model as training data. The resulting trained model may be used to analyze the activity logs to identify suspicious or malicious activity. The potentially malicious activity may be identified based on various actions or requested actions associated with the temporary tokens. For example, as described above, the potentially malicious use of the plurality of temporary access tokens may include creating new temporary access tokens (e.g., indicating a chain of temporary access token requests) or making requests to the target network resource from different network addresses (e.g., from an IP address outside of an organization's range of IP addresses, etc.).

Process 600 may further include performing one or more control actions based on the detected malicious activity. For example, process 600 may further comprise upon identifying potentially malicious use of a particular of the plurality of temporary access tokens, performing at least one of: disabling the particular temporary access token, revoking the particular temporary access token, generating an alert regarding the particular temporary access token, and/or monitoring activity involving the particular temporary access token.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securing the use of temporary access tokens in network environments, the operations comprising:
    identifying a request from a network identity for an action involving a target network resource, wherein the action requires a temporary access token;
    receiving, from the target network resource, a temporary access token generated by the target network resource based on the request for the action;
    storing the temporary access token separate from the network identity;
    generating a customized replacement token having an attribute different from the temporary access token such that the customized replacement token cannot be used directly with the target network resource;
    providing the customized replacement token to the network identity;

monitoring use of the customized replacement token to detect an activity identified as being at least one of potentially anomalous or potentially malicious;

receiving an access request from the network identity to access the target network resource, the access request including the customized replacement token; and based on the detected activity, denying the access request from the network identity.

2. The non-transitory computer readable medium of claim 1, wherein the detected activity includes a use of the customized replacement token to generate an additional temporary access token.

3. The non-transitory computer readable medium of claim 1, wherein the detected activity includes a use of the customized replacement token from an unexpected location.

4. The non-transitory computer readable medium of claim 1, wherein monitoring use of the customized replacement token includes monitoring activity according to a security policy.

5. The non-transitory computer readable medium of claim 1, wherein monitoring use of the customized replacement token includes archiving activity of a plurality of network identities using a plurality of temporary access tokens.

6. The non-transitory computer readable medium of claim 5, wherein the activity is detected based on analysis of the archived activity of the plurality of network identities.

7. The non-transitory computer readable medium of claim 6, wherein the analysis is based on a trained machine learning technique.

8. The non-transitory computer readable medium of claim 1, wherein generating the customized replacement token comprises at least one of:

generating the customized replacement token based on a token generating algorithm; or transmitting a request to the target network resource to generate the customized replacement token.

9. The non-transitory computer readable medium of claim 1, wherein generating the customized replacement token includes adding at least one restriction relative to the temporary access token.

10. The non-transitory computer readable medium of claim 1, wherein the action includes at least one of: accessing the target network resource or obtaining a role for the network identity to use with the network identity.

11. The non-transitory computer readable medium of claim 1, wherein the temporary access token is provided to the network identity on a just-in-time basis.

12. The non-transitory computer readable medium of claim 1, wherein the customized replacement token is generated dynamically in response to the request for the action.

13. The non-transitory computer readable medium of claim 1, wherein the operations further comprise replacing the temporary access token with a new version of the temporary access token.

14. A computer-implemented method for securing the use of temporary access tokens in network environments, the method comprising:

identifying a request from a network identity for an action involving a target network resource, wherein the action requires a temporary access token;

receiving, from the target network resource, a temporary access token generated by the target network resource based on the request for the action;

storing the temporary access token separate from the network identity;

generating a customized replacement token having an attribute different from the temporary access token such that the customized replacement token cannot be used directly with the target network resource;

providing the customized replacement token to the network identity;

monitoring use of the customized replacement token to detect an activity identified as being at least one of potentially anomalous or potentially malicious;

receiving an access request from the network identity to access the target network resource, the access request including the customized replacement token; and based on the detected activity, denying the access request from the network identity.

15. The computer-implemented method of claim 14, further comprising generating at least one alert identifying the detected activity.

16. The computer-implemented method of claim 15, wherein the at least one alert includes at least one recommended action for addressing the detected activity.

17. The computer-implemented method of claim 14, further comprising modifying privileges associated with the network identity.

18. The computer-implemented method of claim 14, further comprising disabling the temporary access token.

19. The computer-implemented method of claim 14, wherein the method is performed by a proxy server configured to intercept communications from the network identity to the target network resource.

20. The computer-implemented method of claim 14, wherein the method is performed by a server common to a network environment of the target network resource.

* * * * *